(No Model.) 2 Sheets—Sheet 1.

C. C. BOWER & A. B. EVANS.
CARRIAGE AND WAGON JACK.

No. 354,385. Patented Dec. 14, 1886.

(No Model.) 2 Sheets—Sheet 2.

C. C. BOWER & A. B. EVANS.
CARRIAGE AND WAGON JACK.

No. 354,385. Patented Dec. 14, 1886.

UNITED STATES PATENT OFFICE.

CHARLES C. BOWER, OF BRISTOL, INDIANA, AND A. BRADFORD EVANS, OF THOMPSONTOWN, PENNSYLVANIA.

CARRIAGE AND WAGON JACK.

SPECIFICATION forming part of Letters Patent No. 354,385, dated December 14, 1886.

Application filed June 24, 1886. Serial No. 206,179. (No model.)

*To all whom it may concern:*

Be it known that we, CHARLES C. BOWER and A. BRADFORD EVANS, both citizens of the United States, residing, respectively, at Bristol, in the county of Elkhart and State of Indiana, and Thompsontown, in the county of Juniata and State of Pennsylvania, have invented a certain new and useful Improvement in Wagon and Carriage Jacks, of which the following is a specification.

Our invention relates to that class of wagon and carriage jacks so made and constructed that in their use a carriage or wagon may be raised bodily from the ground, all the wheels being raised at the same time by the application of force at a single point, the object of our improvement being to provide a machine that will so raise a carriage or wagon bodily by the application of a limited force acting on a single point. We attain this object by the mechanism illustrated and set forth in the accompanying drawings, attached hereto, and made a part hereof, in which—

Figure 1:
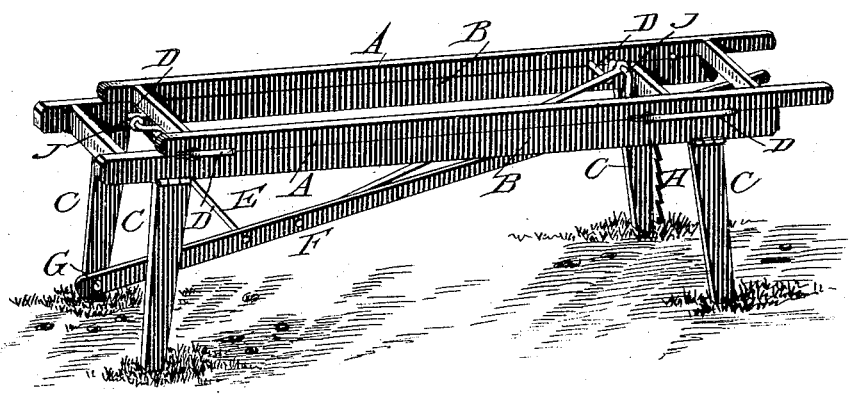
Figure 2:
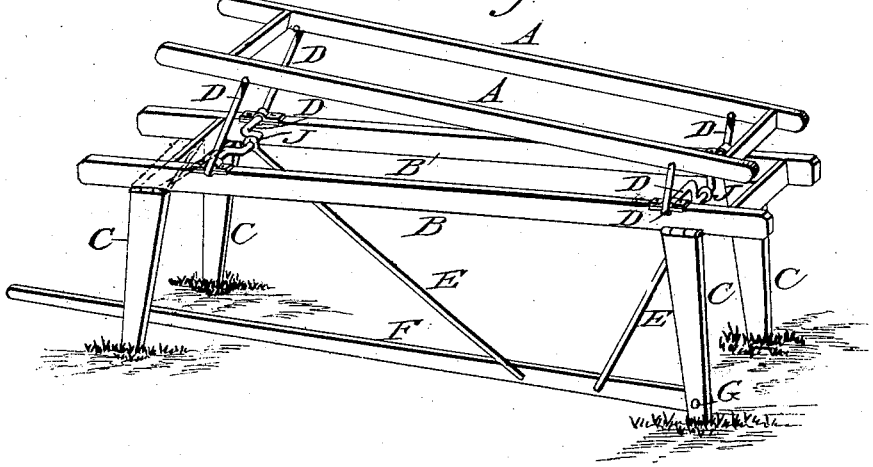
Figure 3:
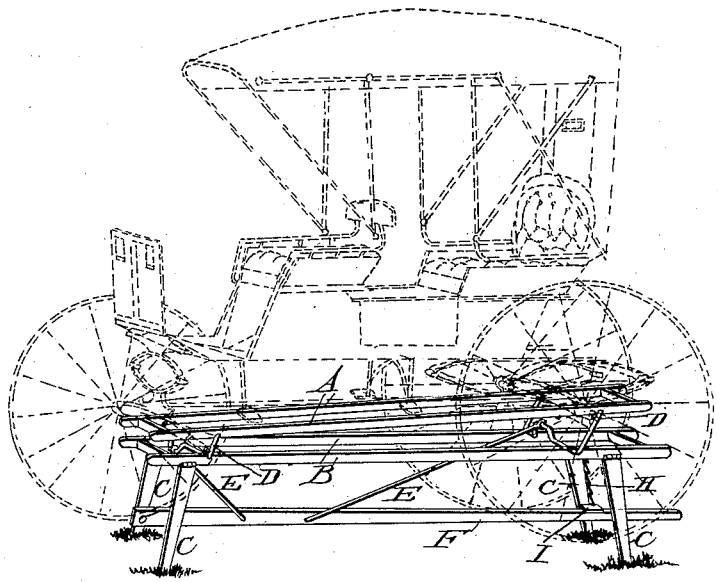

Figure 1 represents the machine as closed ready for use; Fig. 2, the machine raised; Fig. 3, the machine in use supporting carriage.

Similar letters refer to similar parts throughout.

A A represent movable raising-frame resting on the stationary frame B B, which is supported by the legs C C C C. D D are the lever-shafts, with shafts resting on boxes in stationary frame B B, and ends of long levers D D resting in boxes in movable frame A A. To those lever-shafts at end of short lever J are attached the pitmen E E, the opposite ends of which are attached to the foot-lever F. The construction is such that when the foot-lever F is pressed down the pitmen E E turn the lever-shafts D D and raise the movable frame A A. The foot-lever F is held in its position at any point by the ratchet H and the ratchet-dog I on foot-lever. In the illustration the foot-lever F is attached to the leg C at the fulcrum-point G; but the lever may be placed under the middle of the frame and attached to rod or brace extending across the end from the bottom of one leg to the bottom of the other, and the ratchet H then would be placed midway between the legs at the other end and securely fastened to a similar brace or rod. The legs C C C C are so attached to the frame B B that they fold under the machine when the machine is not in use.

It will be observed that levers on lever-shafts, as illustrated in the figures, are of unequal lengths. These are so constructed that carriages the hind and fore wheels of which are of unequal heights may be properly raised from the ground. The same end we also attain by making the legs at the opposite ends of frame of unequal length.

The pitmen E E may be either rods of iron, cables, or rope, and they may be attached to the foot-lever F at the same point, or as represented in the illustrations.

Having now described our invention, what we desire to claim, and secure by Letters Patent, is—

The movable frame A A, resting in the stationary frame B B, with the lever-shafts D D, acted on by the pitmen E E, attached to the foot-lever F, and legs, all combined, as herein fully described and set forth.

CHARLES C. BOWER.
A. BRADFORD EVANS.

Witnesses:
L. B. LANGWORTHY,
WM. R. PALIN,
L. A. CONGDON.